(12) United States Patent
Zhang et al.

(10) Patent No.: US 9,209,595 B2
(45) Date of Patent: Dec. 8, 2015

(54) CATALYTIC CONVERSION OF AN OPTICAL AMPLIFIER GAS MEDIUM

(71) Applicant: ASML Netherlands B.V., Veldhoven (NL)

(72) Inventors: Kevin Zhang, San Diego, CA (US); Christo Liebenberg, San Marcos, CA (US); Alexander Schafgans, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/593,278

(22) Filed: Jan. 9, 2015

(65) Prior Publication Data

US 2015/0222083 A1 Aug. 6, 2015

Related U.S. Application Data

(60) Provisional application No. 61/934,143, filed on Jan. 31, 2014.

(51) Int. Cl.
*H01S 3/00* (2006.01)
*H01S 3/227* (2006.01)
*H01S 3/104* (2006.01)
(Continued)

(52) U.S. Cl.
CPC ............... *H01S 3/227* (2013.01); *H01S 3/036* (2013.01); *H01S 3/104* (2013.01); *H01S 3/134* (2013.01); *H01S 3/2232* (2013.01); *H01S 3/2316* (2013.01)

(58) Field of Classification Search
CPC ........... H01S 3/227; H01S 3/03; H01S 3/031; H01S 3/041
USPC ......................................................... 359/342
See application file for complete search history.

(56) References Cited

U.S. PATENT DOCUMENTS

| 4,672,620 A | 6/1987 | Slusher et al. |
| 4,756,000 A | 7/1988 | Macken |

(Continued)

FOREIGN PATENT DOCUMENTS

| EP | 0311084 A1 | 4/1989 |
| GB | 1256398 A | 12/1971 |

OTHER PUBLICATIONS

Britt Hvolbaek, et al., "Catalytic activity of Au nanoparticles," nanotoday, Aug. 2007, vol. 2, No. 4, pp. 14-18.
Anthony J. DeMaria and Thomas V. Hennessey, Jr., "The CO2 Laser: The Workhorse of the Laser Material Processing Industry", SPIE Professional, 2010, 27 pages.

(Continued)

*Primary Examiner* — Mark Hellner
(74) *Attorney, Agent, or Firm* — DiBerardino McGovern IP Group LLC

(57) ABSTRACT

An extreme ultraviolet light system includes an optical amplifier system and a catalytic conversion system. Each optical amplifier of the optical amplifier system includes a gain medium in the form of a gas mixture that produces an amplified light beam. The optical amplifier system includes a fluid input and a fluid output through which the gas mixture flows. The catalytic conversion system is fluidly connected to the fluid output of the optical amplifier system and to the fluid input of the optical amplifier system. The catalytic conversion system includes a catalytic converter that includes a housing; a substrate within the housing including openings through which the gas mixture can flow; and a catalyst applied as a coating to the interior surfaces of the openings of the substrate, the catalyst including particles of metal. The particles of metal can be nanoparticles of precious metal.

22 Claims, 9 Drawing Sheets

(51) Int. Cl.
*H01S 3/036* (2006.01)
*H01S 3/134* (2006.01)
*H01S 3/223* (2006.01)
*H01S 3/23* (2006.01)

(56) References Cited

U.S. PATENT DOCUMENTS

| | | | |
|---|---|---|---|
| 4,837,770 A * | 6/1989 | Koop | 372/59 |
| 5,590,146 A | 12/1996 | von Borstel | |
| 6,285,703 B1 | 9/2001 | Schleuter | |
| 6,879,616 B2 | 4/2005 | Deile | |
| 7,985,709 B2 | 7/2011 | Jordan et al. | |
| 8,158,960 B2 * | 4/2012 | Vaschenko et al. | 250/504 R |
| 2007/0056601 A1 | 3/2007 | Pillai et al. | |
| 2008/0205471 A1 | 8/2008 | Harrer et al. | |
| 2012/0019826 A1 | 1/2012 | Graham et al. | |
| 2012/0087388 A1 | 4/2012 | Cohn | |
| 2012/0106586 A1 | 5/2012 | Villarreal-Saucedo et al. | |
| 2013/0034472 A1 | 2/2013 | Cantrell et al. | |
| 2014/0140909 A1 | 5/2014 | Qi et al. | |
| 2014/0256534 A1 * | 9/2014 | Gao et al. | 502/5 |

OTHER PUBLICATIONS

"NASA Langley's Low-Temperature Oxidation/Reduction Catalysts" by NASA, at the Technology Gateway, captured on Feb. 17, 2013 at https://web.archive.org/web/20130301000000*/https://technologygateway.nasa.gov/docs/TOA_LARCO1_LoTempOxReduceCat_20web.pdf, vol. 1, Issue 1, 2 pages.

Lineberry, Denise, "NASA Langley Wins 2012 Commercial Invention of the Year," Langley Research Center, dated Apr. 8, 2013, captured on Apr. 11, 2013 at https://web.archive.org/web/20130411035711/http://www.nasa.gov/centers/langley/news/researchernews/rn_2012InventionAward.html, 2 pages.

"Catalytic converter," by Wikipedia, captured on Dec. 17, 2013 at https://web.archive.org/web/20131217213427/http://en.wikipedia.org/wiki/Catalytic_converter, 13 pages.

Moskowitz, Pamela, Authorized Officer of the European Patent Office as the International Searching Authority, "International Search Report" issued in counterpart application PCT/EP2015/050837, mailed Jun. 3, 2015, 5 pages.

Moskowitz, Pamela, Authorized Officer of the European Patent Office as the International Searching Authority, "Written Opinion" issued in counterpart application PCT/EP2015/050837, mailed Jun. 3, 2015, 10 pages.

* cited by examiner

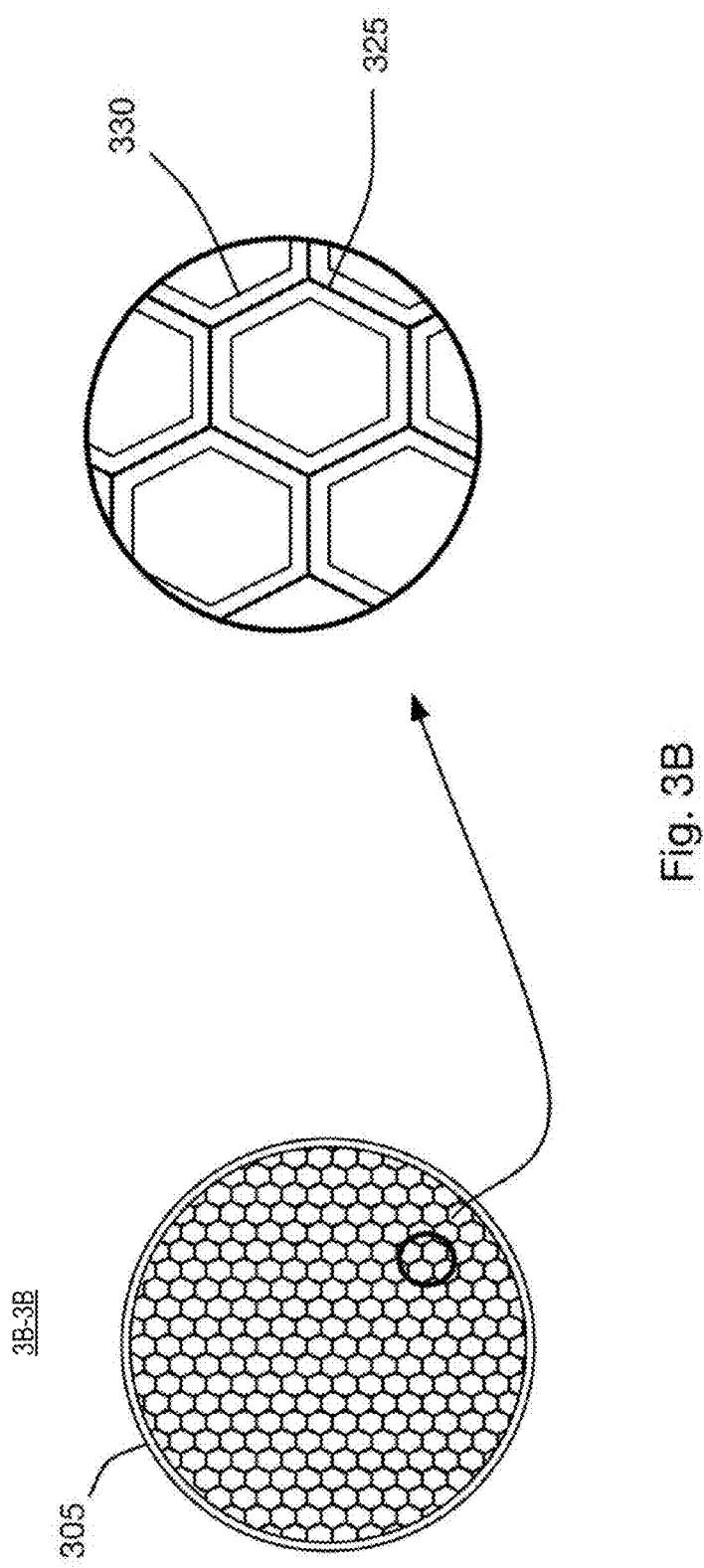

CATALYTIC CONVERSION OF AN OPTICAL AMPLIFIER GAS MEDIUM

CROSS REFERENCE TO RELATED APPLICATION

This application claims the benefit of U.S. Application No. 61/934,143, filed on Jan. 31, 2014, and titled CATALYTIC CONVERSION OF AN OPTICAL AMPLIFIER GAS MEDIUM IN EXTREME ULTRAVIOLET LIGHT SOURCE, which is incorporated herein by reference in its entirety.

TECHNICAL FIELD

The disclosed subject matter relates to a system and method for catalytic conversion of a gas mixture of a gain medium in a drive laser system that produces an amplified light beam of an extreme ultraviolet light (EUV) laser system.

BACKGROUND

Extreme ultraviolet (EUV) light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

$CO_2$ amplifiers and lasers, which output an amplified light beam at a wavelength of about 10600 nm, can present certain advantages as a drive laser irradiating the target material in an LPP process. This may be especially true for certain target materials, for example, for materials containing tin. For example, one advantage is the ability to produce a relatively high conversion efficiency between the drive laser input power and the output EUV power. Another advantage of $CO_2$ drive amplifiers and lasers is the ability of the relatively long wavelength light (for example, as compared to deep UV at 198 nm) to reflect from relatively rough surfaces such as a reflective optic that has been coated with tin debris. This property of 10600 nm radiation can allow reflective mirrors to be employed near the plasma for, for example, steering, focusing and/or adjusting the focal power of the amplified light beam.

SUMMARY

In some general aspects, an extreme ultraviolet light system includes an optical amplifier system and a catalytic conversion system. The optical amplifier system includes one or more optical amplifiers. Each optical amplifier includes a gain medium in the form of a gas mixture that produces an amplified light beam when energy is supplied from an energy supply to pump the gain medium. The optical amplifier system includes a fluid input and a fluid output through which the gas mixture flows. The catalytic conversion system is fluidly connected to the fluid output of the optical amplifier system and to the fluid input of the optical amplifier system. The catalytic conversion system includes a catalytic converter that includes a housing; a substrate within the housing including openings through which the gas mixture can flow; and a catalyst applied as a coating to the interior surfaces of the openings of the substrate, the catalyst including nanoparticles of metal.

Implementations can include one or more of the following features. For example, the openings of the substrate can have a honeycomb geometry. The metal can be a precious metal.

The system can include a heat exchanger separate from the catalytic converter, the heat exchanger including tubing through which the gas mixture flows, the tubing being cooled by an external heat sink. The tubing of the heat exchanger can be coated on its inner surface with a catalyst that facilitates oxidation of the dissociated molecules within the gas mixture.

The system can include a target material delivery system configured to produce a target material at a target location, wherein the amplified light beam is directed toward to the target location to enable interaction between the amplified light beam and the target material to generate a plasma, the plasma emitting extreme ultraviolet (EUV) light.

The catalyst can include nanoparticles of gold. The substrate can be made of a ceramic material.

The catalytic conversion system can be fluidly arranged in parallel with a fluid line formed from the fluid input and fluid output of the optical amplifier system.

The catalytic conversion system can be fluidly arranged in series with a fluid line formed from the fluid input and fluid output of the optical amplifier system.

In other general aspects, a method for producing extreme ultraviolet light includes supplying pump energy to a gain medium of at least one optical amplifier in an optical amplifier system to produce an amplified light beam, the gain medium in the form of a gas mixture, including molecules, at least some of which dissociate during production of the amplified light beam within a tube; directing the gas mixture output from the tube through a substrate fixed within a housing and coated with a catalyst of nanoparticles of metal to thereby oxidize the dissociated molecules of the gas mixture; directing the oxidized gas mixture back into the tube; producing a target material at a target location; and focusing the amplified light beam onto a focal location that enables optical interaction between the amplified light beam and the target material to cause the target material to be converted into a plasma that emits extreme ultraviolet light.

Implementations can include the following features. For example, method can include directing the gas mixture output from the tube through a temperature controlled tubing, to remove heat from the gas mixture before directing the oxidized gas mixture back into the tube.

The method can include at least partially oxidizing dissociated molecules of the gas mixture with a catalyst coated on an interior surface of the tubing.

The method can include regulating a temperature of the gas mixture output from the tube. The temperature of the gas mixture can be regulated by maintaining a temperature of the gas mixture above the temperature of the gas mixture that is output from the tube.

In other general aspects, a catalytic conversion system is a part of an optical amplifier system of an extreme ultraviolet light system. The catalytic conversion system includes an input fluidly connected to the optical amplifier system to receive a gas mixture including dissociated molecules of the gain medium; an output fluidly connected to the optical amplifier system; a housing between the input and the output;

a substrate within the housing including openings through which the gas mixture can flow; and a catalyst applied as a coating to the interior surfaces of the openings of the substrate, the catalyst including nanoparticles of metal.

Implementations can include one or more of the following features. For example, the openings of the substrate can be hexagonal. The housing can be fluidly connected to the input and the output. The metal can be a precious metal.

In other general aspects, a catalytic conversion system is a part of a gas discharge optical amplifier system of an extreme ultraviolet light system. The catalytic conversion system includes a heat regulating system that increases a temperature of a gas mixture output from the optical amplifier system, the gas mixture including dissociated molecules of a gain medium that is excited to produce an amplified light beam from the optical amplifier system; and a catalytic converter receiving the gas mixture at an increased temperature that is output from the heat regulating system. The catalytic converter includes a substrate within a housing and including openings through which the gas mixture can flow; and a catalyst applied as a coating to the interior surfaces of the openings of the substrate. The catalyst includes particles of metal that accelerate oxidation of dissociated molecules within the gas mixture.

Implementations can include one or more of the following features. For example, the openings of the substrate can be hexagonal. The particles of metal can be nanoparticles of precious metal.

In other general aspects, a catalytic conversion system is a part of a gas discharge optical amplifier system of an extreme ultraviolet light system. The catalytic conversion system includes a catalytic converter receiving a gas mixture output from the optical amplifier system, the gas mixture including dissociated molecules of a gain medium that is excited to produce an amplified light beam from the optical amplifier system, and a heat exchanger separate from the catalytic converter. The catalytic converter includes a substrate within a housing and including openings through which the gas mixture can flow; and a catalyst applied as a coating to the interior surfaces of the openings of the substrate, the catalyst including particles of metal that accelerate oxidation of dissociated molecules within the gas mixture. The heat exchanger includes tubing through which the gas mixture flows, the tubing being cooled by an external heat sink.

Implementations can include one or more of the following features. For example, the tubing of the heat exchanger can be coated on its inner surface with a catalyst that accelerates oxidation of the dissociated molecules within the gas mixture. The particles of metal can be nanoparticles of precious metal.

DRAWING DESCRIPTION

FIG. 3B is a cross-sectional view taken along the direction of the flow of the gas mixture (line 3B-3B) of a catalytic converter within the catalytic conversion system of FIGS. 1 and 3A, including a close-up view of one section of the catalytic converter;

DESCRIPTION

Figure 1:
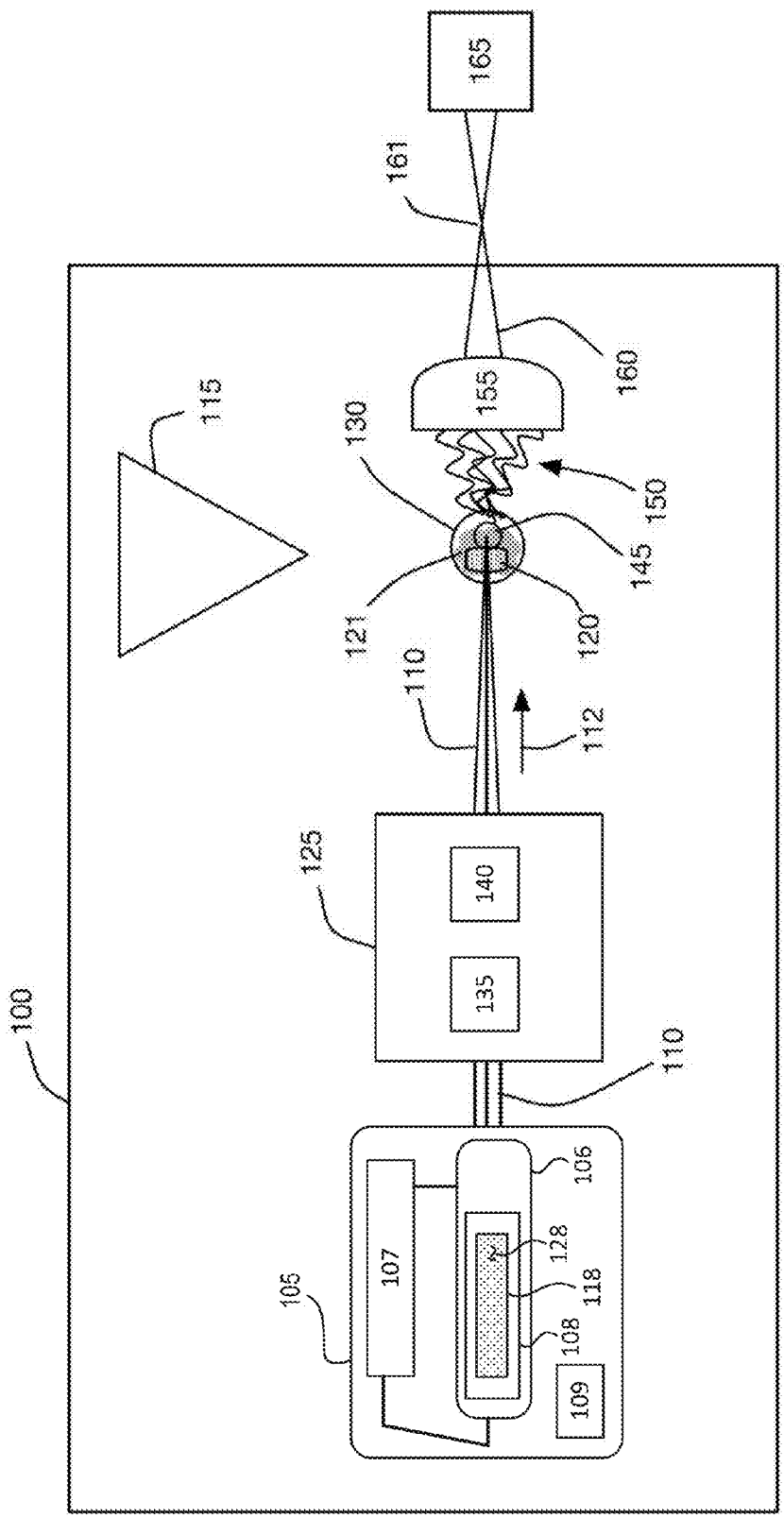
FIG. 1 is a block diagram of an extreme ultraviolet (EUV) light system that includes, as a part of a light source, a catalytic conversion system coupled to an optical amplifier system of the light source.

Referring to FIG. 1, an extreme ultraviolet (EUV) light system 100 includes a light source (or drive laser system) 105 that produces an amplified light beam 110, a target material delivery system 115 configured to produce a target material 120, and a beam delivery system 125 that is configured to receive the amplified light beam 110 emitted from the drive laser system 105 and to direct the amplified light beam 110 toward a target location 130, which receives the target material 120. The beam delivery system 125 includes a beam transport system 135 and a final focus assembly 140 that focuses the amplified light beam 110 at a focal location 145. The interaction between the amplified light beam 110 and the target material 120 produces plasma 121 that emits EUV light or radiation 150. A light collector 155 collects and directs collected EUV light 160 toward an optical apparatus 165 such as a lithography tool.

The drive laser system 105 includes an optical amplifier system 106 along with other optical components such as pre-amplifiers. The optical amplifier system 106 includes at least one optical amplifier 108 having a gain medium 128, which is a gas mixture of molecules capable of optically amplifying the desired wavelength at a high gain, an excitation source such as an electrical source, and internal optics. The gain medium 128 within the optical amplifier 108 is contained within an enclosed volume 118 such as a tube. During electrical pumping of the gain medium 128 of the optical amplifier 108, at least some of the molecules of the gain medium 128 dissociate into one or more molecules or elements that are not involved in the optical amplification, and because of this, the optical amplifier 108 produces less power, which means that the amplified light beam 110 has a lower power. In this case, the interaction between the amplified light beam 110 and the target material 120 ultimately produces less plasma 121, which reduces the amount of EUV light 150 emitted, which reduces the collected EUV light 160 that can be used by the optical apparatus 165. This effect is even more pronounced in a pulsed system in which the electrical source is turned on for periods of time interspersed with times in which it is turned off.

Figure 2A:
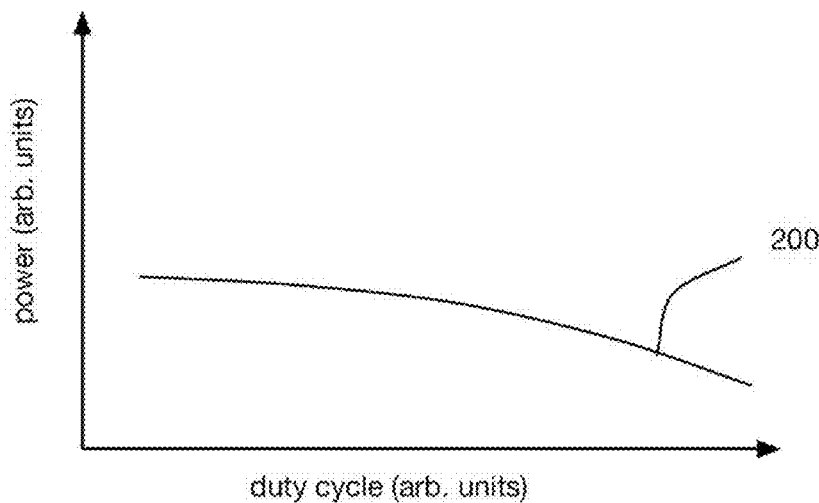
FIG. 2A is a graph of power output from an optical amplifier of the optical amplifier system versus a duty cycle of the optical amplifier without using the catalytic conversion system.

Referring to FIG. 2A, as the duty cycle of the optical amplifier 108 is increased (by increasing the duty cycle of the electrical source), the dissociation of the molecules in the gain medium 128 rises and the power output 200 from the optical amplifier 108 drops off. The duty cycle is the ratio of the time [T(on)] the input power is applied to the electrodes in a cycle over the total time [T(on+off)] in the cycle: T(on)/T (on+off). For example, the optical amplifier 108 can include as the gain medium 128 a gas mixture that includes carbon dioxide ($CO_2$) mixed with other molecules or elements such as helium (He), nitrogen ($N_2$), hydrogen ($H_2$), or water ($H_2O$). When the optical amplifier 108 is electrically pumped using a gas discharge, energy is transferred to the $CO_2$ molecules, and more and more of these $CO_2$ molecules dissociate into carbon monoxide (CO) and oxygen ($O_2$) as the duty cycle is increased.

Figure 2B:
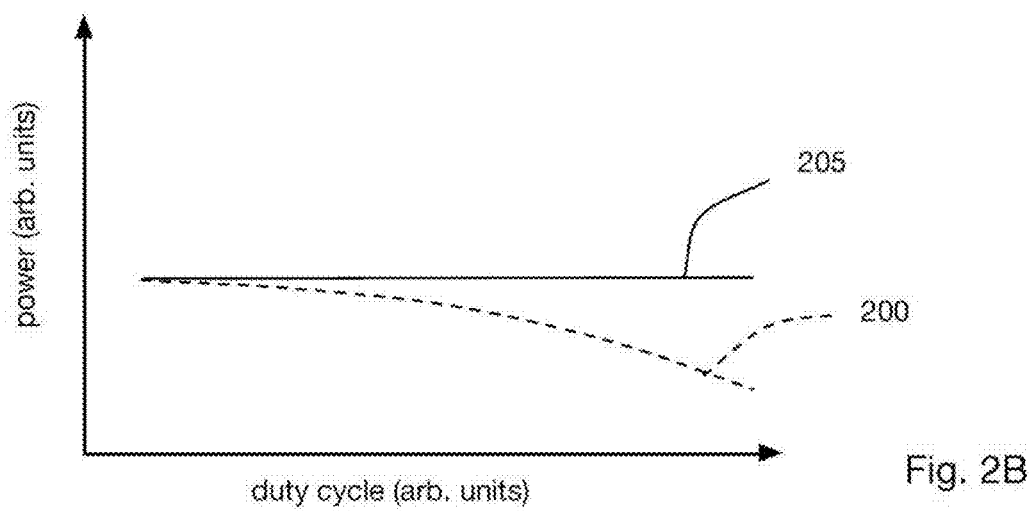
FIG. 2B is a graph of power output from an optical amplifier of the optical amplifier system versus the duty cycle of the optical amplifier using the catalytic conversion system of FIG. 1, and the graph from FIG. 2A is overlaid on top for comparison.

Unless the dissociated molecules are converted back into the original molecules of the gas mixture that are used for optical amplification, the output power of the drive laser system 105 will remain unacceptably low, especially as the duty cycle is increased. The process of converting the dissociated molecules back into the original molecules is done via catalytic conversion. The extreme ultraviolet light system 100 or the drive laser system 105 includes a catalytic conversion system 107 that receives the gas mixture that includes the dissociated molecules from the optical amplifier 108, performs the step or steps involved in catalytic conversion (for example, oxidation) of the molecules into the original molecules that contribute to optical amplification, and re-introduces this gas mixture back into the optical amplifier 108. The catalytic conversion system 107 is fluidly connected to the enclosed volume 118 that houses the gain medium 128 at a first end to enable the gas mixture (which contains the excess of dissociated molecules) of the gain medium 128 to flow from the optical amplifier 108 to the catalytic conversion system 107 and at a second end to enable the gas mixture (which has been oxidized) from the catalytic conversion system 107 to the optical amplifier 107. Referring to FIG. 2B, in this way, the gas mixture is effectively maintained with the original molecules that contribute to optical amplification, and the power output 205 from the drive laser system 105 can be maintained at a suitable level, even as the duty cycle is increased. Moreover, the power output can be maintained without having to raise the amount of energy applied to the excitation source of the optical amplifier 108 and without having to add additional gas mixture with oxidized molecules into the fluid lines (for example, the tube that houses the gain medium of the optical amplifier 108). The dashed line shown in FIG. 2B shows the power output 200 from FIG. 2A overlaid on the graph for comparison.

The drive laser system 105 can also include a controller 109 that performs various tasks such as monitoring components within the optical amplifier 108 and the catalytic conversion system 107, performing analysis or calculations based on the monitored information, and providing instructions to components within the drive laser system 105 based on the results of the analysis or calculations.

Figure 3A:
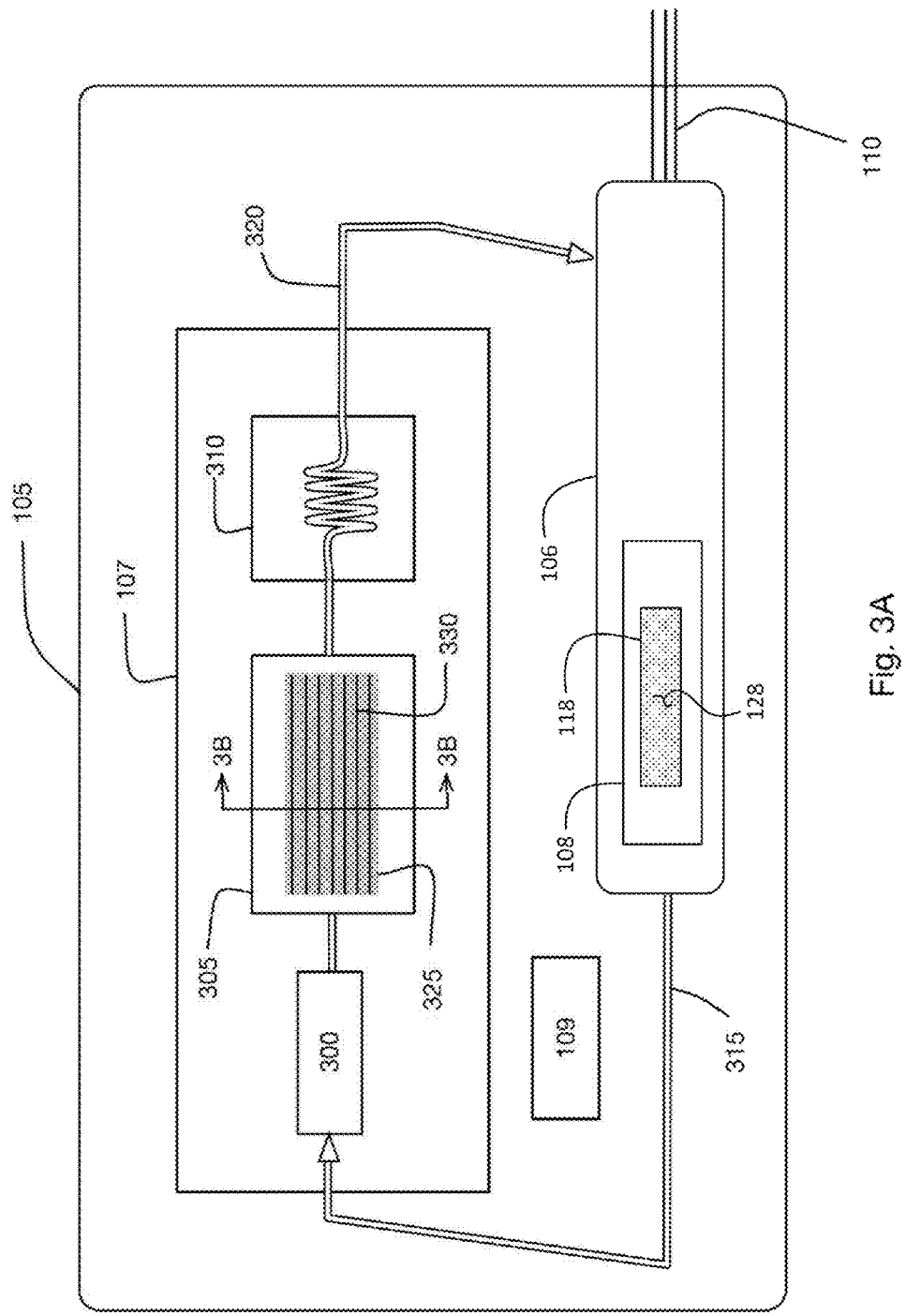
FIG. 3A is a block diagram of the light source that includes the optical amplifier system and the catalytic conversion system.

Referring to FIG. 3A, an exemplary catalytic conversion system 107 can be designed as a part of or in combination with an external cooler or heat exchanger system that removes excess heat from the gas mixture that is produced during operation of the optical amplifier 108. In this example, the system 107 optionally includes a gas pre-heater 300, a catalytic converter 305, and a heat exchanger 310. The gas mixture from the optical amplifier 108 flows out of the enclosed volume 118 of the optical amplifier 108 through an enclosed pipe or tube 315 toward the system 107, and the gas mixture from the system 107 flows through enclosed pipe or tube 320 and into the enclosed volume 118 of the optical amplifier 108 to be reused during operation and production of the amplified light beam 110. The pipes 315, 320 can be made of a material such as, for example, stainless steel, aluminum, or metal alloy, that does not react to the gas mixture that flows through the pipes 315, 320.

The gas pre-heater 300 can be used to raise and regulate the temperature of the gas mixture before and as it enters the catalytic converter 305, thus improving the conversion efficiency within the catalytic converter 305. In particular, by heating the dissociated gas mixture before it enters the catalytic converter 305, the temperature of the dissociated gas mixture can be maintained at a temperature at which the catalyst 330 within the catalytic converter 305 is most effective in causing or accelerating oxidation of the dissociated molecules within the gas mixture. Thus, for example, the controller 109 could monitor the temperature of the gas mixture within the pipe 315, determine whether the temperature is at an optimum value at which the catalyst 330 is most effective, and, if the temperature is below that optimum value, the controller 109 could send a signal to the pre-heater 300 to raise the temperature of the gas mixture to a particular value.

In general, the higher the temperature of the gas mixture, the higher the catalytic efficiency. For example, the catalytic reaction rate within a gas mixture can double with every 10° C. rise in temperature applied to the gas mixture. If the catalytic elements are installed inside a $CO_2$ laser or amplifier, then depending on the laser configuration, the temperature of the gas mixture can rise to 60° C. In another application, a fraction of the laser gas mixture (for example, less than about 10%) can be bled off in a close-loop circulation system, through an external catalytic converter, in which case the temperature of the gas mixture can be raised to any desired level (such as, for example, 100° C.). Some catalytic converters (such as those in the automotive industry or in early $CO_2$ laser systems) operate at temperatures much greater than this level, for example, around 240° C. Using a high-efficiency material for the catalyst acts to reduce the requirement for high gas temperature to effect high catalytic conversion efficiency. In the system 100 and method described herein, the temperature set-point for the gas mixture is determined by balancing the efficiency of the heat exchanger 310 within the catalytic conversion system 107 with the need to increase the rate of catalytic conversion of CO and $O_2$ to $CO_2$. This can be done by conducting a systematic study of the power output from the optical amplifier 108, the power output being a function of the temperature of the gas mixture that is output from the heat exchanger 310, and the concentration of CO and/or $O_2$ versus the temperature of the gas mixture at the input to the catalytic converter 305.

Referring also to FIG. 3B, the catalytic converter 305 includes a support structure 325 that has a surface area to make contact with the gas mixture, and a catalyst 330 applied to the surface of the support structure 325. The catalyst 330 is a substance that causes or accelerates the chemical reaction (which, in this case, is the catalytic conversion or oxidation) without itself being affected. Thus, the catalyst 330 participates in the reaction, but is neither a reactant nor a product of the reaction it catalyzes. The catalyst 330 can be a metal substance such as any one or more of platinum, rhodium, palladium, and gold. For example, the catalyst 330 could include platinum mixed with gold.

The support structure 325 can be a ceramic structure such as, for example, $Al_2O_3$, $SiO_2$, or $TiO_2$. The catalyst 330 can be coated onto the support structure 325 in order to create a structure 325 that exposes the most surface area of catalyst to the gas mixture, while also reducing the amount of catalyst needed. The support structure 325 can be a honeycomb structure having a geometry that is an array of hollow cells through which the gas mixture flows. The cells can be columnar and hexagonal in shape.

In one implementation, the catalyst 330 is made of particles (for example, nanoparticles) of a metal (such as a precious metal such as gold, silver, palladium, or platinum) applied to a honeycomb support structure 325. If gold is used as the catalyst, then it can be used in nanoparticle form. The metal that is used can be ductile and have a high luster. The particles of metal can be applied to the structure 325 using any suitable technique, such as, for example, electrolytic plating. The metal that can be used for the catalyst 330 can have a relatively high work function to facilitate catalytic reactions. The work function depends on the configuration of the atoms at the surface of the catalyst 330 in addition to the actual element used for the catalyst 330. A relatively high work function means that the work function is high enough that the metal speeds up the underlying chemical reaction (oxidation), but the metal is not consumed by the oxidation; hence the metal can be recovered chemically unchanged at the end of the oxidation that it has been used to speed up, or catalyze. Precious metals can be suitable metals for use as the catalyst 330. As mentioned, the metal particles can be nanoparticles, which means that the particles have a size that is 100 nanometers (nm) or less.

The heat exchanger 310 can be any suitable device that removes heat from the gas mixture. In some implementations, the heat exchanger 310 is hollow tubing through which the gas mixture flows, the exterior surface of the hollow tubing being cooled by a fluid such as water. In some implementations, the heat exchanger 310 can further be coated on its interior with a catalyst such as gold to provide some amount of catalytic conversion of the gas mixture that flows through the tubing of the heat exchanger 310. Thus, the catalyst coating on the interior of the hollow tubing accelerates or causes the oxidation of the dissociated molecules within the gas mixture. Typically, the catalytic conversion that takes place within the heat exchanger 310 is not adequate because the surface area of the catalyst that interacts with the gas mixture and the amount of time the dissociated molecules contact the catalyst can be lower than needed to fully convert the dissociated molecules of the gas mixture. Nevertheless, the heat exchanger 310 can provide for oxidation of the dissociated molecules of the gas mixture.

Thus, in summary, the catalytic conversion system 107 contains the gas pre-heater 300 to heat the gas mixture to a stable temperature (and maintain it at this stable temperature) so that the catalytic efficiency within the catalytic converter 305 is near or at its highest point; the catalytic converter 305 containing an active catalyst 330 on a honeycomb substrate such as substrate 325 downstream from the gas pre-heater 300. Both the gas pre-heater 300 and the catalytic converter 305 can be placed upstream of the gold-plated heat exchanger 310, which can therefore act as the second stage of the catalytic conversion within the system 107. Due to its coating method and relatively small catalytic surface area (when compared with the catalytic surface area of the catalytic converter 305), the gold-plated heat exchanger 310 is not as effective as the first stage (including the catalytic converter 305 and optionally the gas pre-heater 300) in this system 107. The catalytic surface area of the gold-plated heat exchanger 310 is the interior surface of the tubing and this surface area is less than the catalytic surface area of the catalytic converter 305. The catalytic surface area of the catalytic converter 305 is higher because it is a honeycomb design having many pores in the structure allowing the reactants (for example, CO and $O_2$) to be in contact with the catalyst 330 more easily than the smooth surface of the gold-coated heat exchanger 310. As an exemplary comparison, the total catalytic surface area of the gold-plated heat exchanger 310 can be on the order of about 10 $m^2$, whereas the substrate 325 (which is a honeycomb structure) can provide greater than about 100 $m^2$ surface area for the same foot print or mechanical volume.

The catalytic converter 305 can be a system such as that being manufactured by STC Catalysts, Inc. of Hampton, Va. (STC). STC manufactures ambient temperature catalysts, which can be used without the need for a gas pre-heater 300. What makes STC's catalysts potentially suitable is the fact that they can work at lower temperatures than other catalysts, enabling them to be used inside a vessel that houses the optical amplifier 108, which can use $CO_2$ as the gain medium 128 and preferably before an internal heat exchanger. However, catalyst materials can perform better at elevated temperatures (including those made by STC), and are many times used in external gas circulation laser systems (external catalyst). It is possible that for certain applications for the EUV light system 100, the STC catalyst operated at a low temperature could be sufficient for converting small amounts of CO and $O_2$ to $CO_2$. However, for EUV light source applications, the power output requirement from $CO_2$ laser is so high that a catalytic converter operated at higher temperature, even using the STC catalysts, is beneficial.

The catalytic converter 305 can be pre-fabricated and obtained from companies such as, for example, Corning Incorporated of Corning, N.Y.; Engelhard, which is now BASF Corporation of Iselin, N.J.; and Allied Signal.

Additional details about other components of the EUV light system 100 are provided next.

The optical amplifier 108 may or may not have laser mirrors or other feedback devices that form a laser cavity. Thus, the drive laser system 105 produces the amplified light beam 110 due to the population inversion in the gain media of the optical amplifiers 108 even if there is no laser cavity. Moreover, the drive laser system 105 can produce an amplified light beam 110 that is a coherent laser beam if there is a laser cavity to provide enough feedback to the drive laser system 105. The term "amplified light beam" encompasses one or more of: light from the drive laser system 105 that is merely amplified but not necessarily a coherent laser oscillation and light from the drive laser system 105 that is amplified and is also a coherent laser oscillation.

The optical amplifiers 108 in the drive laser system 105 can include as a gain medium 128 a filling gas that includes $CO_2$ and can amplify light at a wavelength of between about 9100 and about 11000 nm, and in particular, at about 10600 nm. Suitable amplifiers and lasers for use in the drive laser system 105 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers 108 in the drive laser system 105 can also include a cooling system such as a liquid-cooling system that can be used when operating the drive laser system 105 at higher powers. The liquid-cooling system can employ water, which can be kept at a lower temperature than the optical amplifiers.

Figure 4:
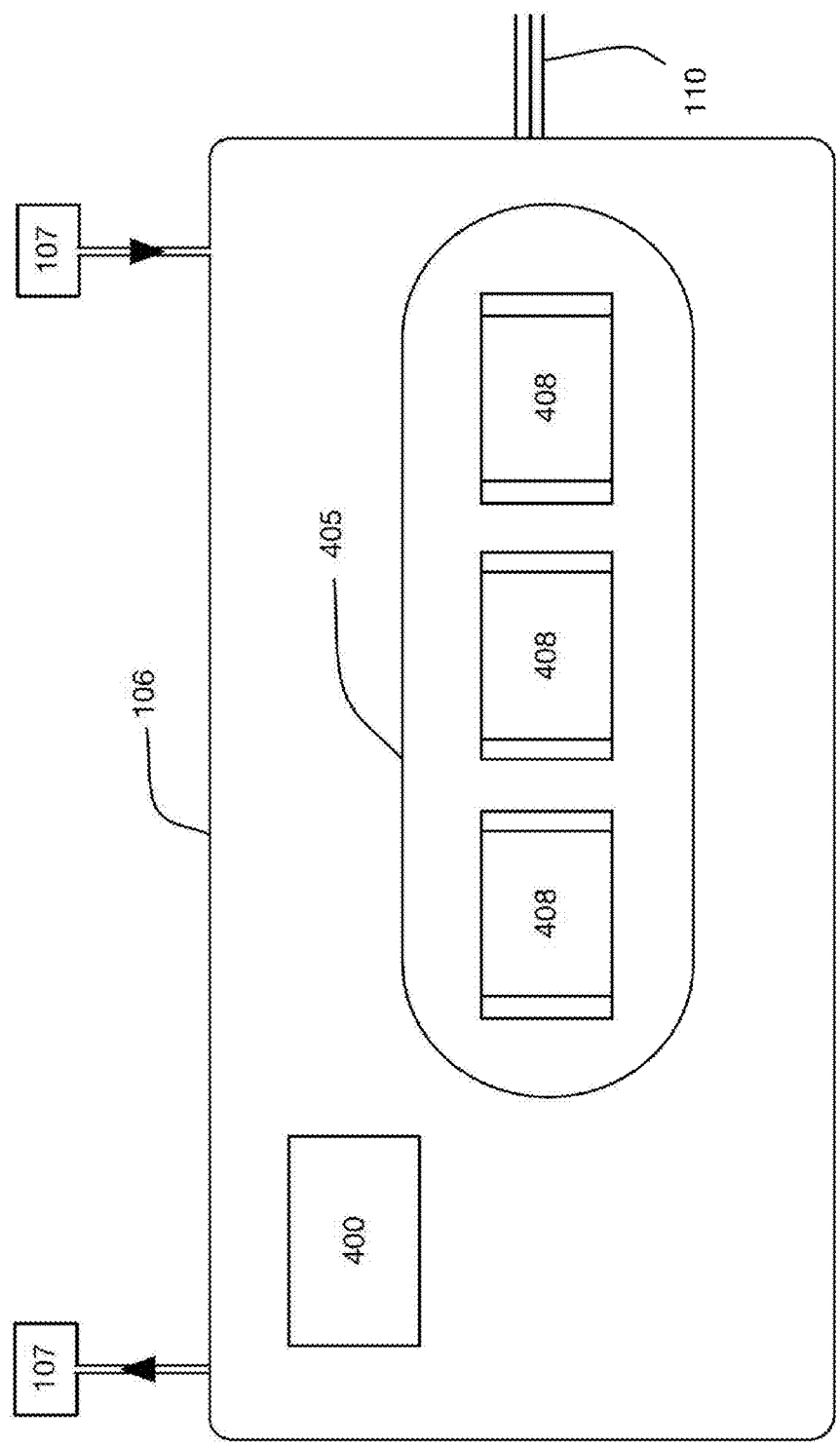
FIG. 4 is a block diagram of an exemplary optical amplifier system that can be used in the EUV light system of FIGS. 1 and 3A.

In some implementations, such as shown in FIG. 4, an exemplary optical amplifier system 106 includes a first amplifier that acts as a pre-amplifier 400, and a plurality 405 of optical amplifiers 408. The pre-amplifier 400 can be a diffusion-cooled $CO_2$ laser such as the TruCoax $CO_2$ laser produced by TRUMPF Inc. of Farmington, Conn. The optical amplifiers 408 within the plurality 405 can be fast axial flow high-power $CO_2$ lasers with wear-free gas circulation and capacitive radio-frequency excitation such as the TruFlow $CO_2$ laser produced by TRUMPF Inc. of Farmington, Conn.

The final focus assembly 140 focuses the amplified light beam 110 so that the diameter of the beam 110 is at a minimum in the focal region 145. In other words, the final focus assembly 140 causes the radiation in the amplified light beam 110 to converge as it propagates toward the focal region 145 in a direction 112 of propagation. In the absence of a target material 120, the radiation in the amplified light beam 110 diverges as the beam 110 propagates away from the focal region 145 in the direction 112.

The final focus assembly 140 is that part of the beam delivery system 125 that modifies the wavefront of the amplified light beam 110 to change its beam divergence and cause it to focus at the focal location 145. Thus, if the wavefront of the amplified light beam 110 that enters the final focus assembly 140 has a zero curvature (and is therefore collimated), then the output of the final focus assembly 140 is an amplified light beam having a positive curvature, which means that the center of the wavefront is pointing opposite to a propagation direction of the amplified light beam, that is, the wavefront is retarded when compared to a wavefront edge. Therefore, the final focus assembly 140 positively alters the curvature of the wavefront of the amplified light beam 110 output from the assembly 140 relative to the amplified light beam 110 that enters the final focus assembly 140 such that the amplified light beam 110 is focused at the focal location 145. The final focus assembly 140 can include one or more transmissive optical elements each having a curved surface, or one or more reflective optical elements, each having a curved surface.

The light collector 155 captures at least some of the EUV light 150 emitted from the plasma 121 and directs the captured light 160 to an optical apparatus 165 that uses the captured extreme ultraviolet light 160 in a specific application. The light collector 155 has a first focus at or near the target location 130 or the focal location 145, and a second focus at an intermediate location 161 (also called an intermediate focus) where the EUV light 160 can be output from the extreme ultraviolet light system 100 and can be input to the optical apparatus 165.

The amplified light beam 110 is a pulsed light beam and it includes at least a first set of pulses that are focused at the focal location 145 to enable interaction between the amplified light beam 110 and the target material 120 to cause the target material 120 to be converted into the plasma 121 that emits extreme ultraviolet light 150. The focal location 145 needs to be close enough to the target material 120 to enable the amplified light beam 110 to interact with the target material 120 in a manner that causes the target material 120 to be converted into the plasma that emits extreme ultraviolet light 150. Thus, it is possible for the focal location 145 to overlap the target location 130, but not actually overlap with the target material 120. In other implementations, the focal location 145 overlaps the target material 120.

The amplified light beam 110 can optionally include a second set of pulses that condition the target material 120 in some way, but do not interact to cause the target material 120 to be converted into a plasma that emits extreme ultraviolet light 150. This second set of pulses can be interspersed spatially and temporally with the first set of pulses along the same beam path. For example, the second set of pulses can be configured to interact with the target material 120 before it reaches the target location 130 so as to modify a geometric distribution of the target material 120 before it reaches the target location 130. The second set of pulses can be referred to as "pre-pulses" or a pre-pulse beam.

Moreover, while only one amplified light beam 110 is shown in FIG. 1 as being directed to the target location 130, in other implementations, the drive laser system 105 can produce two or more amplified light beams 110 along spatially distinct beam paths or overlapping beam paths that are temporally displaced from each other. For example, a pre-pulse beam can be directed toward a first target location and a main beam can be directed toward a second target location (the target location 130) at the output of the final focus assembly 140.

Figure 5:
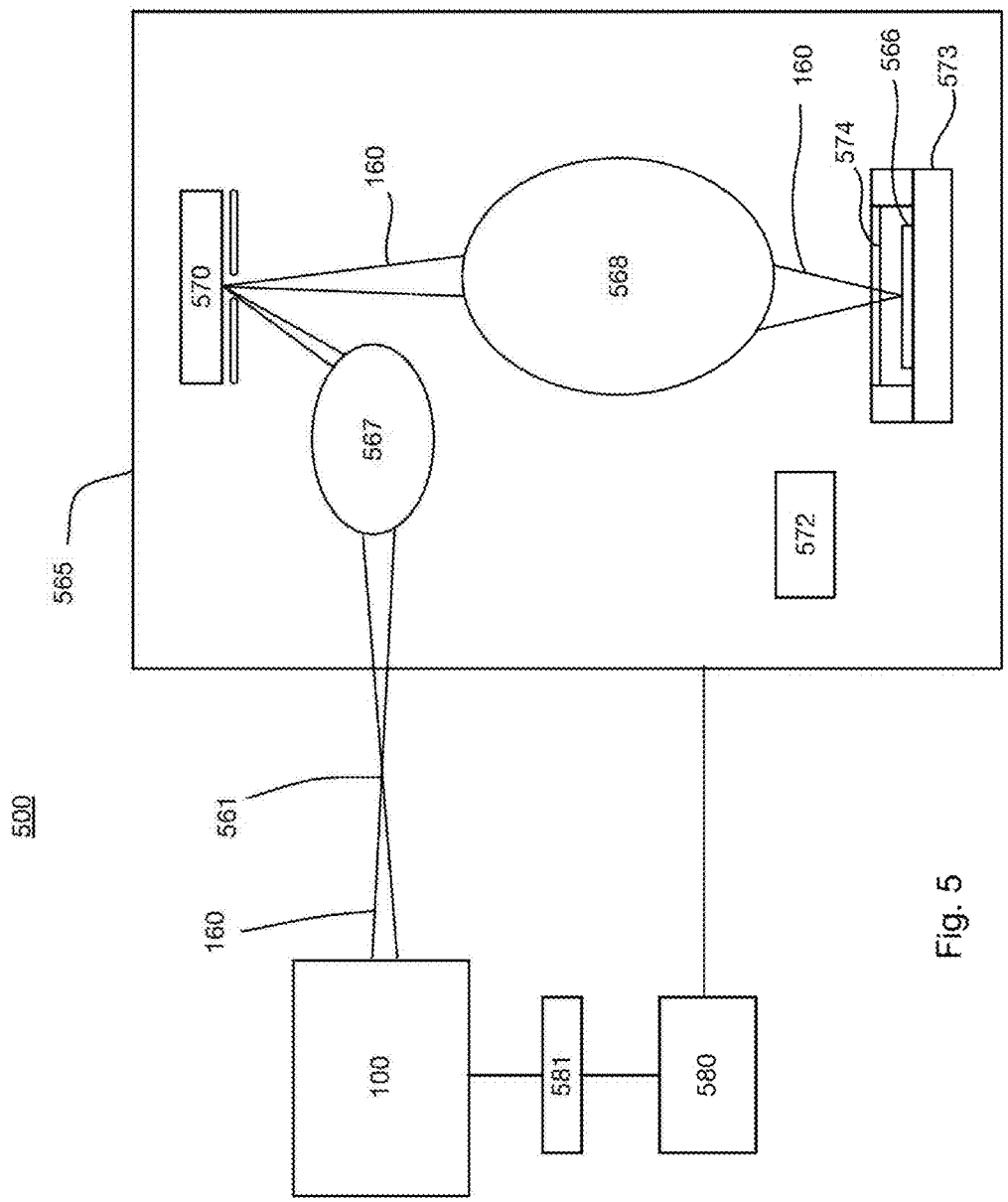
FIG. 5 is a block diagram of an exemplary photolithography system that includes the EUV light system of FIGS. 1 and 3A.

Referring to FIG. 5, in some implementations, the extreme ultraviolet light system 100 is used in a photolithography system 500 to supply extreme ultraviolet (EUV) light 160 to an optical apparatus such as a lithography exposure apparatus 565. The photolithography system 500 includes one or more master controllers 580 connected to one or more control or actuation systems 581 that are connected to components within the extreme ultraviolet light system 100, as discussed in greater detail with reference to FIG. 6.

The EUV light 160 is directed to the lithography exposure apparatus 565, which uses this light 160 to create a pattern on a wafer 566. The EUV light 160 may be directed through an illuminator 567, which can include optical elements such as reflective optical elements that modify aspects such as the wavefront curvature of the EUV light 160. For example, the illuminator 567 can include one or more reflectors coated with a special coating (such as a multilayer coating) that is able to reflect as much EUV light 160 as possible. Because such reflectors tend to absorb some of the EUV light 160, it may be advantageous to use as few as possible.

The EUV light 160 exiting the illuminator 567 is directed to a reflective mask 570. The EUV light 160 exiting the reflective mask 570 is directed through a set 568 of projection optics, which include one or more reflectors coated with a special coating for reflecting the EUV light 160 and also are configured to focus the EUV light 160 to the wafer 566. The projection optics set 568 adjusts the range of angles for the EUV light 160 impinging on the wafer 566, and enables the image transfer to occur from the reflective mask 570 to the photoresist on the wafer 566. For example, the projection optics set 568 can include a series of four to six curved mirrors, reducing the size of the image and focusing the image onto the wafer 566. Each of these mirrors bends the EUV light 160 slightly to form the image that will be transferred onto the wafer 566.

Moreover, the lithography exposure apparatus 567 can include, among other features, a lithography controller 572, air conditioning devices, and power supplies for the various electrical components. In some implementations, the wafer 566 is carried on a wafer stage 573 and an immersion medium 574 can be supplied to cover the wafer 566 for immersion lithography. In other implementations, the wafer 566 is not covered by an immersion medium 574.

The wafer 566 can be processed using any number of process steps, which can be one or more of a combination of process steps such as etching, deposition, and lithography processes with a different mask to create a pattern of openings (such as grooves, channels, or holes) in the material of the wafer or in materials deposited on the wafer. These openings can be filled with insulative, conductive, or semiconductive materials to build layers of the microelectronic features on the wafer. The wafer is then singulated to form individual chips, which can be incorporated into a wide variety of electronic products, such as computers and other consumer or industrial electronic devices.

Figure 6:
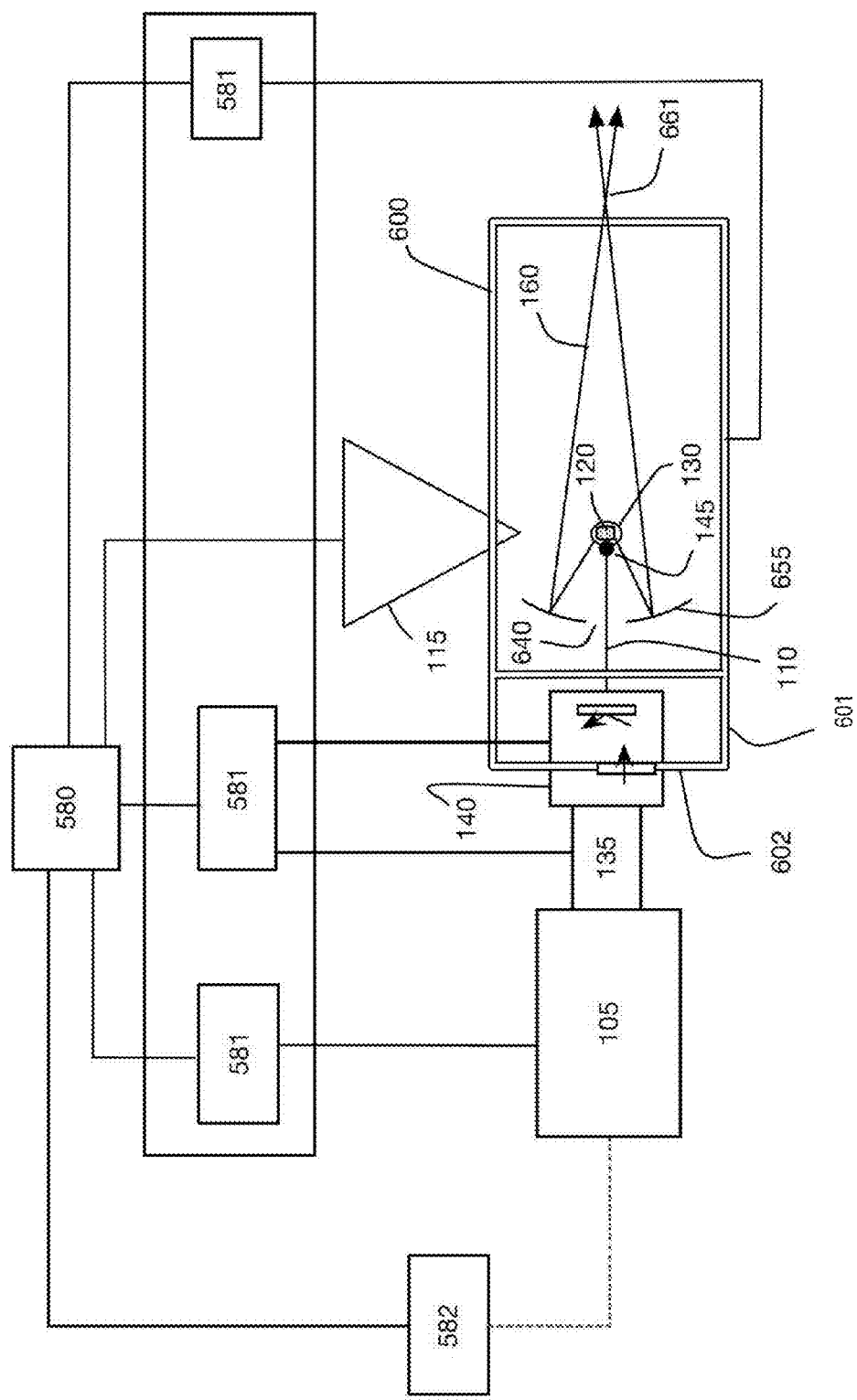
FIG. 6 is a block diagram of an exemplary system that includes the EUV light system of FIGS. 1 and 3A.

Referring to FIG. 6, in some implementations, the extreme ultraviolet light system 100 is a part of a system that includes other components, such as a vacuum chamber 600, one or more controllers 580, one or more actuation systems 581, and a guide laser 582.

The vacuum chamber 600 can be a single unitary structure or it can be set up with separate sub-chambers that house specific components. The vacuum chamber 600 is at least a partly rigid enclosure from which air and other gases are removed by a vacuum pump, resulting in a low pressure environment within the chamber 600. The walls of the chamber 600 can be made of any suitable metals or alloys that are suitable for vacuum use (can withstand the lower pressures).

Additionally, the final focus assembly 140 can be positioned entirely outside of the vacuum chamber 600, can be positioned partly inside the vacuum chamber 600 (so that some of the components of the assembly 140 are inside the low pressure environment while others are outside the low pressure environment, or can be entirely inside the vacuum chamber 600. Or, the final focus assembly 140 can be partly inside a sub-chamber 601 of the vacuum chamber 600. For example, as shown in FIG. 6, the final focus assembly 140 is partly inside a sub-chamber 601 of the vacuum chamber 600.

The target material delivery system 115 delivers the target material 120 to the target location 130. The target material 120 at the target location can be in the form of liquid droplets, a liquid stream, solid particles or clusters, solid particles contained within liquid droplets or solid particles contained within a liquid stream. The target material 120 can include, for example, water, tin, lithium, xenon, or any material that, when converted to a plasma state, has an emission line in the EUV range. For example, the element tin can be used as pure tin (Sn), as a tin compound, for example, $SnBr_4$, $SnBr_2$, $SnH_4$, as a tin alloy, for example, tin-gallium alloys, tin-indium alloys, tin-indium-gallium alloys, or any combination of these alloys. The target material 120 can include a wire coated with one of the above elements, such as tin. If the target material 120 is in a solid state, it can have any suitable shape, such as a ring, a sphere, or a cube. The target material 120 can be delivered by the target material delivery system 115 into the interior of the chamber 800 and to the target location 130. The target location 130 is also referred to as an irradiation site, the place where the target material 120 optically interacts with the amplified light beam 110 to produce the plasma.

The light collector 155 can be a collector mirror 655 having an aperture 640 to allow the amplified light beam 110 to pass through and reach the focal location 145. The collector mirror 655 can be, for example, an ellipsoidal mirror that has a first focus at the target location 130 or the focal location 145, and a second focus at an intermediate location 661 (also called an intermediate focus) where the EUV light 160 can be output from the extreme ultraviolet light system and can be input to the optical apparatus 165.

The one or more controllers 580 are connected to the one or more actuation systems or diagnostic systems, such as, for example, a droplet position detection feedback system, a laser control system, and a beam control system, and one or more target or droplet imagers. The target imagers provide an output indicative of the position of a droplet, for example, relative to the target location 130 and provide this output to the droplet position detection feedback system, which can, for example, compute a droplet position and trajectory from which a droplet position error can be computed either on a droplet by droplet basis or on average. The droplet position detection feedback system thus provides the droplet position error as an input to the controller 580. The controller 580 can therefore provide a laser position, direction, and timing correction signal, for example, to the laser control system that can be used, for example, to control the laser timing circuit and/or to the beam control system to control an amplified light beam position and shaping of the beam transport system to change the location and/or focal power of the beam focal spot within the chamber 600.

The target material delivery system 115 includes a target material delivery control system that is operable in response to a signal from the controller 580, for example, to modify the release point of the droplets as released by an internal delivery mechanism to correct for errors in the droplets arriving at the desired target location 130.

Additionally, extreme ultraviolet light system 100 can include a light source detector that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector generates a feedback signal for use by the controller 580. The feedback signal can be, for example, indicative of the errors in parameters such as the timing and focus of the laser pulses to properly intercept the droplets in the right place and time for effective and efficient EUV light production.

In some implementations, the drive laser system 105 has a master oscillator/power amplifier (MOPA) configuration with multiple stages of amplification and having a seed pulse that is initiated by a Q-switched master oscillator (MO) with low energy and high repetition rate, for example, capable of 100 kHz operation. From the MO, the laser pulse can be amplified, for example, using RF pumped, fast axial flow, $CO_2$ amplifiers to produce the amplified light beam 110 traveling along a beam path.

Although three optical amplifiers can be used, it is possible that as few as one amplifier and more than three amplifiers could be used in this implementation. In some implementations, each of the $CO_2$ amplifiers can be an RF pumped axial flow $CO_2$ laser cube having a 10 meter amplifier length that is folded by internal mirrors.

Alternatively, the drive laser system 105 can be configured as a so-called "self-targeting" laser system in which the target material 120 serves as one mirror of the optical cavity. In some "self-targeting" arrangements, a master oscillator may not be required. The drive laser system 105 includes a chain of amplifier chambers, arranged in series along a beam path, each chamber having its own gain medium and excitation source, for example, pumping electrodes. Each amplifier chamber can be an RF pumped, fast axial flow, $CO_2$ amplifier chamber having a combined one pass gain of, for example, 1,000-10,000 for amplifying light of a wavelength λ of, for example, 10600 nm. Each of the amplifier chambers can be designed without laser cavity (resonator) mirrors so that when set up alone they do not include the optical components needed to pass the amplified light beam through the gain medium more than once. Nevertheless, as mentioned above, a laser cavity can be formed as follows.

In this implementation, a laser cavity can be formed by adding a rear partially reflecting optic to the drive laser system 105 and placing the target material 120 at the target location 130. The optic can be, for example, a flat mirror, a curved mirror, a phase-conjugate mirror, or a corner reflector having a reflectivity of about 95% for wavelengths of about 10600 nm (the wavelength of the amplified light beam 110 if $CO_2$ amplifier chambers are used). The target material 120 and the rear partially reflecting optic act to reflect some of the amplified light beam 110 back into the drive laser system 105 to form the laser cavity. Thus, the presence of the target material 120 at the target location 130 provides enough feedback to cause the drive laser system 105 to produce coherent laser oscillation and in this case, the amplified light beam 110 can be considered a laser beam. When the target material 120 isn't present at the target location 130, the drive laser system 105 may still be pumped to produce the amplified light beam 110 but it would not produce a coherent laser oscillation unless some other component provides enough feedback. This arrangement can be a so-called "self-targeting" laser system in which the target material 120 serves as one mirror (a so-called plasma mirror or mechanical q-switch) of the optical cavity.

Depending on the application, other types of amplifiers or lasers can also be suitable, for example, an excimer or molecular fluorine laser operating at high power and high pulse repetition rate. Examples include a MOPA configured excimer laser system, as shown, for example, in U.S. Pat. Nos. 6,625,191; 6,549,551; and 6,567,450; an excimer laser having one or more chambers, for example, an oscillator chamber and one or more amplifying chambers (with the amplifying chambers in parallel or in series); a master oscillator/power oscillator (MOPO) arrangement, a power oscillator/power amplifier (POPA) arrangement; or a solid state laser that seeds one or more excimer or molecular fluorine amplifier or oscillator chambers, may be suitable. Other designs are possible.

At the irradiation site, the amplified light beam 110, suitably focused by the final focus assembly 140, is used to create plasma having certain characteristics that depend on the composition of the target material 120. These characteristics can include the wavelength of the EUV light 160 produced by the plasma and the type and amount of debris released from the plasma. The amplified light beam 110 evaporates the target material 120, and heats the vaporized target material to a critical temperature at which electrons are shed (a plasma state), leaving behind ions, which are further heated until they start emitting photons having a wavelength in the extreme ultraviolet range.

Figure 7A:
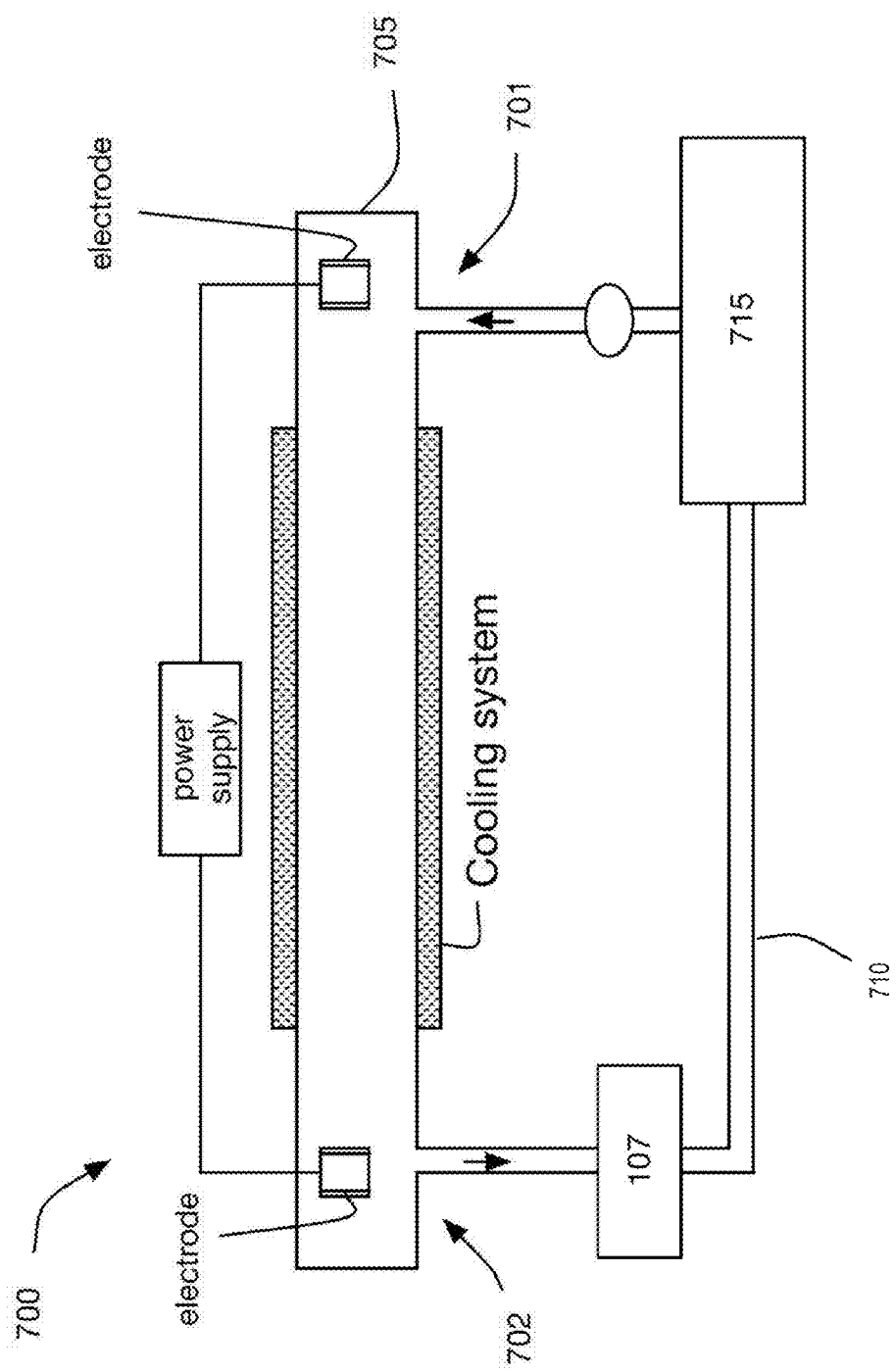
FIGS. 7A and 7B are block diagrams of exemplary optical amplifiers and exemplary catalytic conversion system.

Referring to FIG. 7A, in one implementation, the optical amplifier 108 is designed as an axial flow system 700 in which the gas mixture is pumped in one end 701 of a gas discharge tube 705 and out the other end 702 of the tube 705 through a gas pump and supply line 710. In other implementations, the optical amplifier 108 can be designed as a transverse gas flow system in which the molecular gas laser flows across the gas discharge tube (such as the tubes 705, 755) instead of flowing down the tube (as in FIGS. 7A and 7B). In this way, higher power ratings can be obtained for continuous laser operation of the molecular gas.

In either axial flow or transverse flow implementations, fresh gas is provided to replace the gas molecules that are depleted due to dissociation of the gas molecules. In one example in which the optical amplifier 108 is a carbon dioxide molecular gas laser, the gas mixture includes $CO_2$, and He and $N_2$ are added to the gas mixture to boost efficiency. While an axial flow system 700 is discussed, this design can also apply to a transverse gas flow system. The axial (or transverse) flow system 700 includes a recirculation pump (or blower) and gas supply system 715 that includes a recirculation pump (or blower) for pushing the gas mixture from the tube 705 and through the line 710 and a gas supply that replaces gas molecules that are depleted due to dissociation. The catalytic conversion system 107 can be placed internal to (or in series with) the gas line 710 of this axial (or transverse) flow system 700. Such a placement (namely, within the gas line 710 and thus in series with the gas line 710) for the catalytic conversion system 107 can be appropriate in situations in which the optical amplifier system 106 can tolerate higher levels of oxygen.

Figure 7B:
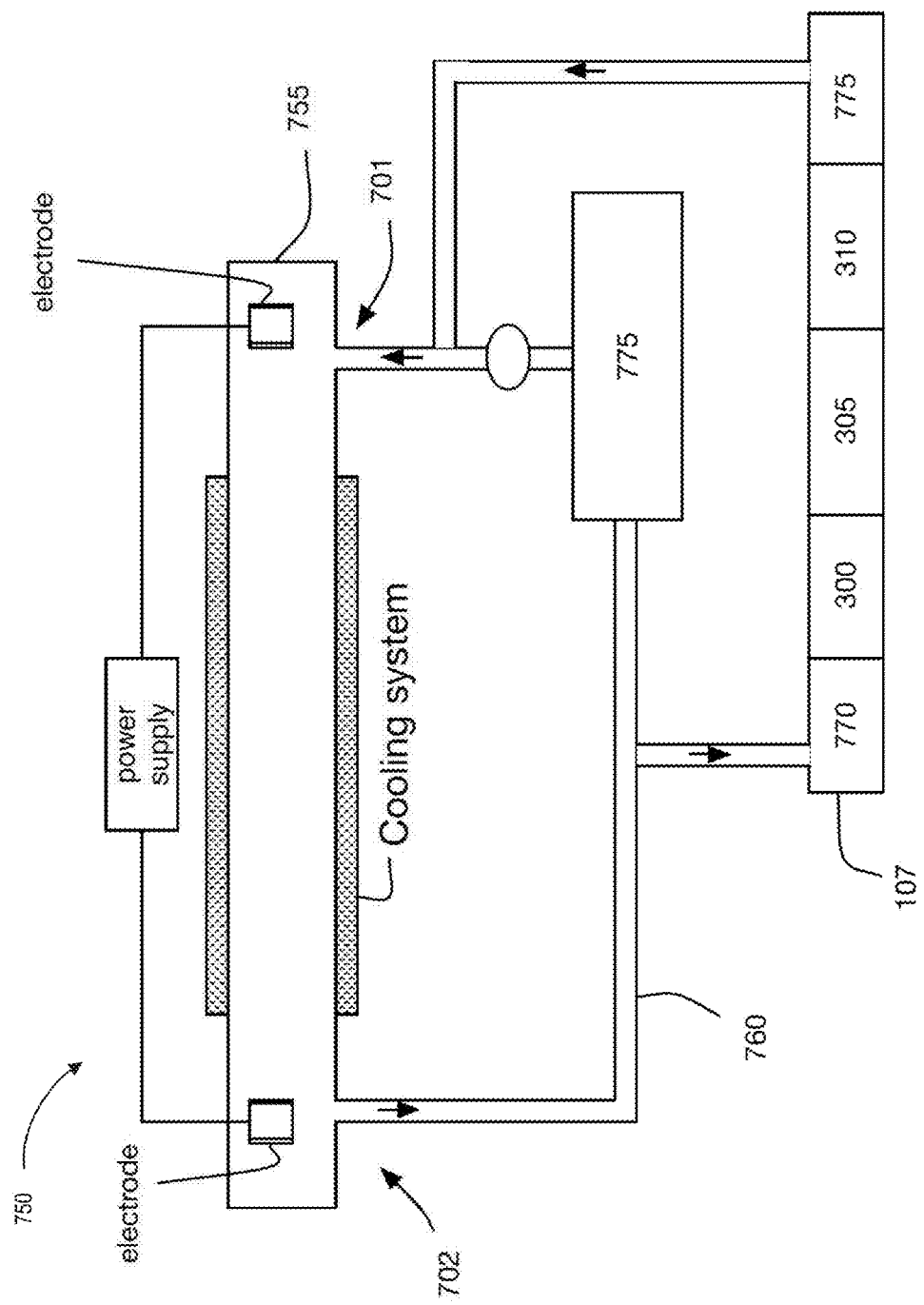

Referring to FIG. 7B, in other implementations of an axial (or transverse) flow system 750, the catalytic conversion system 107 is placed external to (that is, in parallel with) the gas line 760 of the axial (or transverse) flow system 750, which includes a gas discharge tube 755 that houses the gas mixture. Such a placement (namely, outside of and parallel with the gas line 760) for the catalytic conversion system 107 can be appropriate in situations in which the optical amplifier system 106 cannot tolerate high levels of oxygen within the gas mixture, for example, if the oxygen must be less than 0.2% of the total gas mixture.

Typically, a fraction (for example, about 1-20%, or around 5%) of the gas mixture can be drawn downstream from the discharge region of the tube 755 (where $O_2$ concentration is high), directed through the gas line 760, and sent through the catalyst elements 300, 305, 310 of the catalytic conversion system 107 (to remove $O_2$ by oxidation) before re-introducing the gas mixture back into the gas line 760 (upstream from the discharge region of the tube 755). In this implementation, the catalytic conversion system 107 can also include a control valve 770 and a recirculation pump or blower 775.

In the external catalyst configuration of FIG. 7B, the temperature of the gas mixture can be regulated by either a gas heat exchanger (such as the heat exchanger 310) or a counter-current gas heat exchanger. Such an external configuration can provide more control over the temperature of the gas mixture because the temperature can be adjusted outside of the gas line 760. An alternative is to heat the catalyst itself. For an EUV light source application such as that shown in FIG. 1, heating the gas mixture may be desired since the heating of the gas mixture can result in a more uniform temperature distribution within the gas mixture stream and on the catalyst surface.

Other implementations are within the scope of the following claims.

What is claimed is:

1. An extreme ultraviolet light system comprising:
an optical amplifier system comprising one or more optical amplifiers, each optical amplifier including a gain medium in the form of a gas mixture that produces a pulsed amplified light beam when energy is supplied from an energy supply to pump the gain medium according to a duty cycle, the optical amplifier system comprising a fluid input and a fluid output through which the gas mixture flows;
a catalytic conversion system, fluidly connected to the fluid output of the optical amplifier system and to the fluid input of the optical amplifier system, the catalytic conversion system comprising a catalytic converter comprising:
a housing;
a substrate within the housing including openings through which the gas mixture can flow; and
a catalyst applied as a coating to the interior surfaces of the openings of the substrate, the catalyst comprising nanoparticles of metal; and
a heat exchanger separate from the catalytic converter, the heat exchanger comprising tubing through which the as mixture flows the tubing of the heat exchanger being coated on its inner surface with a catalyst that facilitates oxidation of the dissociated molecules within the gas mixture.

2. The system of claim 1, wherein the openings of the substrate have a honeycomb geometry.

3. The system of claim 1, wherein the tubing is cooled by an external heat sink.

4. The system of claim 1, further comprising a target material delivery system configured to produce a target material at a target location, wherein the amplified light beam is directed toward to the target location to enable interaction between the amplified light beam and the target material to generate a plasma, the plasma emitting extreme ultraviolet (EUV) light.

5. The system of claim 1, wherein the catalyst comprises nanoparticles of gold.

6. The system of claim 1, wherein the substrate is made of a ceramic material.

7. The system of claim 1, wherein the catalytic conversion system is fluidly arranged in parallel with a fluid line formed from the fluid input and fluid output of the optical amplifier system.

8. The system of claim 1, wherein the catalytic conversion system is fluidly arranged in series with a fluid line formed from the fluid input and fluid output of the optical amplifier system.

9. The system of claim 1, wherein the metal is a precious metal.

10. A method for producing extreme ultraviolet light, the method comprising:
   supplying pump energy to a gain medium of at least one optical amplifier in an optical amplifier system to produce a pulsed amplified light beam, the gain medium in the form of a gas mixture, including molecules, at least some of which dissociate during production of the amplified light beam within a tube;
   regulating the temperature of the gas mixture that is output from the tube;
   directing the temperature regulated gas mixture through a substrate fixed within a housing and coated with a catalyst of nanoparticles of metal to thereby oxidize the dissociated molecules of the gas mixture;
   directing the oxidized gas mixture back into the tube;
   producing a target material at a target location; and
   focusing the amplified light beam onto a focal location that enables optical interaction between the amplified light beam and the target material to cause the target material to be converted into a plasma that emits extreme ultraviolet light.

11. The method of claim 10, further comprising directing the gas mixture output from the tube through a temperature controlled tubing, to remove heat from the gas mixture before directing the oxidized gas mixture back into the tube.

12. The method of claim 10, further comprising at least partially oxidizing dissociated molecules of the gas mixture with a catalyst coated on an interior surface of the tubing.

13. The method of claim 10, wherein regulating the temperature of the gas mixture comprising maintaining a temperature of the gas mixture above the temperature of the gas mixture that is output from the tube.

14. The method of claim 10, wherein the metal is a precious metal.

15. A catalytic conversion system for an optical amplifier system of an extreme ultraviolet light system, the catalytic conversion system comprising:
   a catalytic converter comprising:
      an input fluidly connected to the optical amplifier system to receive a gas mixture including dissociated molecules of a gain medium in the optical amplifier system;
      an output fluidly connected to the optical amplifier system;
      a housing between the input and the output;
      a substrate within the housing including openings through which the gas mixture can flow; and
      a catalyst applied as a coating to the interior surfaces of the openings of the substrate, the catalyst comprising nanoparticles of metal; and
   a heat exchanger separate from the catalytic converter, the heating exchanger including tubing through which the gas mixture from the catalytic converter flows, the tubing being coated on its inner surface with a catalyst that accelerates oxidation of the dissociated molecules within the gas mixture.

16. The catalytic conversion system of claim 15, wherein the openings of the substrate are hexagonal.

17. The catalytic conversion system of claim 15, wherein the housing is fluidly connected to the input and the output.

18. A catalytic conversion system for a gas discharge optical amplifier system of an extreme ultraviolet light system, the system comprising:
   a heat regulating system that increases a temperature of a gas mixture output from the optical amplifier system, the gas mixture including dissociated molecules of a gain medium that is excited to produce an amplified light beam from the optical amplifier system; and
   a catalytic converter receiving the gas mixture at an increased temperature that is output from the heat regulating system, the catalytic converter comprising:
      a substrate within a housing and including openings through which the gas mixture can flow; and
      a catalyst applied as a coating to the interior surfaces of the openings of the substrate, the catalyst comprising particles of metal that accelerate oxidation of dissociated molecules within the gas mixture.

19. The catalytic conversion system of claim 18, wherein the openings of the substrate are hexagonal.

20. The catalytic conversion system of claim 18, wherein the particles of metal are nanoparticles of precious metal.

21. A catalytic conversion system for a gas discharge optical amplifier system of an extreme ultraviolet light system, the catalytic conversion system comprising:
   a catalytic converter receiving a gas mixture output from the optical amplifier system, the gas mixture including dissociated molecules of a gain medium that is excited to produce an amplified light beam from the optical amplifier system, the catalytic converter comprising:
      a substrate within a housing and including openings through which the gas mixture can flow; and
      a catalyst applied as a coating to the interior surfaces of the openings of the substrate, the catalyst comprising particles of metal that accelerate oxidation of dissociated molecules within the gas mixture; and
   a heat exchanger separate from the catalytic converter, the heat exchanger comprising tubing through which the gas mixture flows, the tubing being cooled by an external heat sink and being coated on its inner surface with a catalyst that accelerates oxidation of the dissociated molecules within the gas mixture.

22. The catalytic conversion system of claim 21, wherein the particles of metal are nanoparticles of precious metal.

* * * * *